US006487399B1

United States Patent
Rajaniemi et al.

(10) Patent No.: US 6,487,399 B1
(45) Date of Patent: Nov. 26, 2002

(54) MOBILE TERMINAL EMPLOYING 30KHZ/200KHZ CARRIER IDENTIFICATION

(75) Inventors: Jari Rajaniemi, Oulu (FI); Kari Kananen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/320,634

(22) Filed: May 26, 1999

(51) Int. Cl.$^7$ .......................... H04B 17/00; H04B 7/00; H04Q 7/20

(52) U.S. Cl. ................. 455/226.1; 455/226.2; 455/509; 455/450; 455/464; 455/513; 455/553; 370/335; 370/337; 370/465

(58) Field of Search .................... 455/226.1, 226.2, 455/226.4, 450, 464, 509, 513, 553, 636, 442, 443, 444, 449, 437, 227; 370/252, 335, 337, 342, 465

(56) References Cited

U.S. PATENT DOCUMENTS

| | | | |
|---|---|---|---|
| 4,556,760 A | 12/1985 | Goldman ........................ 179/2 |
| 5,020,093 A | 5/1991 | Pireh ............................ 379/59 |
| 5,168,508 A | 12/1992 | Iwasaki et al. | |
| 5,442,806 A | 8/1995 | Barber et al. .............. 455/33.1 |
| 5,640,385 A | 6/1997 | Long et al. | |
| 5,711,001 A | 1/1998 | Bussan et al. .............. 455/432 |
| 6,035,213 A | * 3/2000 | Tokuda et al. .............. 370/441 |
| 6,160,801 A | * 12/2000 | Uchida et al. .............. 370/335 |
| 6,229,996 B1 | * 5/2001 | Uistola .................... 455/161.1 |
| 6,282,420 B1 | * 8/2001 | Bamburak et al. .......... 455/434 |
| 6,393,284 B1 | * 5/2002 | Dent .......................... 370/347 |

FOREIGN PATENT DOCUMENTS

| | | |
|---|---|---|
| EP | 0 715 417 A2 | 6/1996 |
| EP | 0 812 069 A2 | 12/1997 |

* cited by examiner

Primary Examiner—Nguyen T. Vo
Assistant Examiner—Edan Orgad
(74) Attorney, Agent, or Firm—Harrington & Smith, LLP

(57) ABSTRACT

A method for use by a multi-mode, dual band mobile terminal (10) for identifying a presence of a GSM1900 carrier that is channelized into first channels having a bandwidth of 200 kHz, and for distinguishing the GSM1900 carrier from at least a TDMA1900 carrier that is channelized into second channels having a bandwidth of 30 kHz. The method includes steps of (a) tuning a receiver (16) to a frequency of a candidate GSM1900 channel; (b) determining a value of a received signal strength indicator (RSSI) using a 200 kHz receiver passband filter; (c) if the RSSI value is above a predetermined threshold, converting the frequency of the candidate GSM1900 channel into a frequency of a TDMA1900 channel using a predetermined relationship; (d) retuning the receiver to the frequency of the TDMA1900 channel; (e) determining a RSSI value using a 30 kHz receiver passband filter for the TDMA1900 channel, and also for at least two adjacent TDMA1900 channels, assuming that two adjacent TDMA1900 channels are not used together in a same cell; and, if the at least three RSSI values are all found to be approximately equal within some threshold value, (f) making at least an initial assumption of the presence of the GSM1900 carrier. A further step can be executed of verifying that the assumed GSM1900 carrier is not actually a CDMA1900 carrier. The method has an initial step of camping on a channel of a carrier in another frequency band (e.g., a TDMA800 channel), and the steps of tuning and retuning are executed without changing a baseband clock frequency from a frequency associated with the channel that the mobile terminal is camped on.

17 Claims, 4 Drawing Sheets

1900 MHz BAND MEASURED THROUGH 200 kHz FILTER.

CHANNEL ABOVE THRESHOLD LEVEL ARE MEASURED THROUGH
30 kHz FILTER

ADJACENT GSM1900 CHANNEL IS MEASURED THROUGH
30 kHz FILTER

MOBILE TERMINAL EMPLOYING 30KHZ/ 200KHZ CARRIER IDENTIFICATION

FIELD OF THE INVENTION

This invention relates in general to the field of mobile terminals, such as cellular telephones, and more particularly relates to multi-mode, dual band mobile terminals.

BACKGROUND OF THE INVENTION

One conventional dual band, multi-mode mobile terminal contains two receivers, one for GSM1900 (Global System for Mobile Communications (GSM), 1900 MHz) service and one for AMPS (Advanced Mobile Phone Service (AMPS), 800 MHz) service. In addition to operating in different frequency bands, these system also typically exhibit different channel bandwidths and spacings. For example, TDMA1900 and AMPS channels have a width of 30 kHz, while GSM1900 employs a 200 kHz channel width.

Recently some network providers have expressed an interest providing a Digital AMPS (DAMPS) plus GSM1900 mobile terminal. As can be appreciated, due to cost and size constraints it would be very desirable to provide but a single receiver in the mobile terminal, as opposed to two separate receivers (one for each band of interest).

A single receiver mobile terminal would normally contain only one crystal oscillator, and as a result only one system-specific baseband (BB) clock can be derived at any given time (typically by using a phase locked loop (PLL)). If the mobile terminal happens to be camped on a low priority network, it must search periodically search for a higher priority network. Since, for example, the GSM1900 and DAMPS networks cannot communicate their presence to the mobile terminal, the mobile terminal must be able to search for the higher priority network itself. However, the mobile terminal does not know a priori which channels are TDMA1900, CDMA1900 or GSM1900 channels. If the mobile terminal must then periodically change its BB clock frequency when searching for other (higher priority) channels, then synchronization is lost to the current channel on which the mobile station is camped. Since this channel will normally be a channel on which the mobile terminal receives pages, which inform the mobile terminal of the presence of an incoming call, it is possible that the mobile terminal can miss incoming calls when searching for other networks. This is obviously an undesirable situation from both the user's and the network operator's point of view.

It is noted that one might consider using a Fast Fourier Transform (FFT) frequency spectrum analysis or filtering method to search for a desired carrier. However, this method is not desirable since the location of the 30 kHz carriers can vary within the 200 kHz window.

OBJECTS AND ADVANTAGES OF THE INVENTION

It is a first object and advantage of this invention to provide a technique that enables a mobile terminal to identify and distinguish transmissions from different wireless services, without having to retune a baseband clock that is used to receive pages.

It is another object and advantage of this invention to provide a multi-mode, dual band mobile terminal having an ability to recognize and distinguish, by example, a GSM1900 channel from a TDMA1900 channel or a CDMA1900 channel, without having to use the GSM1900-specific baseband clock, thereby reducing unnecessary baseband clock changes and a number of missed pages from a currently serving system.

It is a further object and advantage of this invention to provide a multi-mode, dual band mobile terminal having an ability to recognize and distinguish, by example, a CDMA800 carrier from a TDMA800/AMPS carrier.

SUMMARY OF THE INVENTION

The foregoing and other problems are overcome and the objects and advantages of the invention are realized by methods and apparatus in accordance with embodiments of this invention.

This invention teaches a technique to identify and distinguish, for example, a GSM1900 carrier from a TDMA1900 or a CDMA1900 carrier, without requiring a change to the system-specific BB clock frequency. The use of this invention thus aids in avoiding unnecessary BB clock frequency changes. The mobile terminal constructed and operated in accordance with this invention accomplishes this important function by selectively filtering and then measuring received signal levels.

A specific method is disclosed for identifying a GSM1900 channel with an AMPS/TDMA800/TDMA1900/GSM1900 dual band, quadruple mode mobile terminal when operating in the 800 MHz band in the AMPS or the TDMA800 mode. In this method the mobile terminal measures Received Signal Strength Indicator (RSSI) levels in a candidate GSM1900 MHz channel through a 30 kHz bandpass filter, and a 200 kHz bandwidth GSM1900 channel is identified if the RSSI values of at least three adjacent 30 kHz channel measurements are sufficiently close together.

An underlying assumption made by the teachings of this invention is that, in accordance with typical network design practice, adjacent 30 kHz TDMA1900 channels are not used in the same cell. As such, if the mobile terminal finds sufficiently large RSSI values in at least three adjacent 30 kHz channels, the presence of TDMA1900 channels is unlikely, and instead a wider bandwidth 200 kHz GSM1900 channel may be present.

An important benefit that results from the practice of the teachings of this invention is that the mobile terminal is enabled to recognize and distinguish a GSM1900 carrier from a TDMA1900 or a CDMA1900 carrier, without requiring a change in the system-specific baseband clock frequency. Similarly, a TDMA800/AMPS carrier can be distinguished from a CDMA800 carrier (1.23 MHz bandwidth). By the use of this method the mobile terminal is enabled to reduce unnecessary baseband clock frequency changes, and thus reduces the chance that a page will be missed during a search for another network.

The method in accordance with this invention employs a technique based on a frequency spectrum analysis, and exploits to advantage the fact that the GSM1900 channel width is 200 kHz, that the TDMA800/AMPS/TDMA1900 channel width is 30 kHz, and that the CDMA800 channel width is 1.23 MHz.

This invention thus provide a method for use by a multi-mode, dual band mobile terminal for identifying a presence of a GSM1900 carrier that is channelized into first channels having a bandwidth of 200 kHz, and for distinguishing the GSM1900 carrier from at least a TDMA1900 carrier that is channelized into second channels having a bandwidth of 30 kHz. The method includes steps of (a) tuning a receiver to a frequency of a candidate GSM1900 channel; (b) determining a value of a received signal strength indicator (RSSI) using a 200 kHz receiver passband filter; (c) if the RSSI value is above a predetermined threshold, converting the frequency of the candidate GSM1900 channel into a frequency of a TDMA1900 channel using a predetermined relationship; (d) retuning the receiver to the frequency of the TDMA1900 channel; (e) determining a RSSI value using a 30 kHz receiver passband filter for the TDMA1900 channel, and also for at least two adjacent TDMA1900 channels, assuming that two adjacent TDMA1900 channels are not used together in a same cell; and, if the at least three RSSI values are all found to be approximately equal within some threshold value, (f) making at least an initial assumption of the presence of the GSM1900 carrier. A further step can be executed of verifying that the assumed GSM1900 carrier is not actually a CDMA1900 carrier.

The method has an initial step of camping on a channel of a carrier in another frequency band (e.g., a TDMA800 channel), and the steps of tuning and retuning are executed without changing a baseband clock frequency from a frequency associated with the channel that the mobile terminal is camped on.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
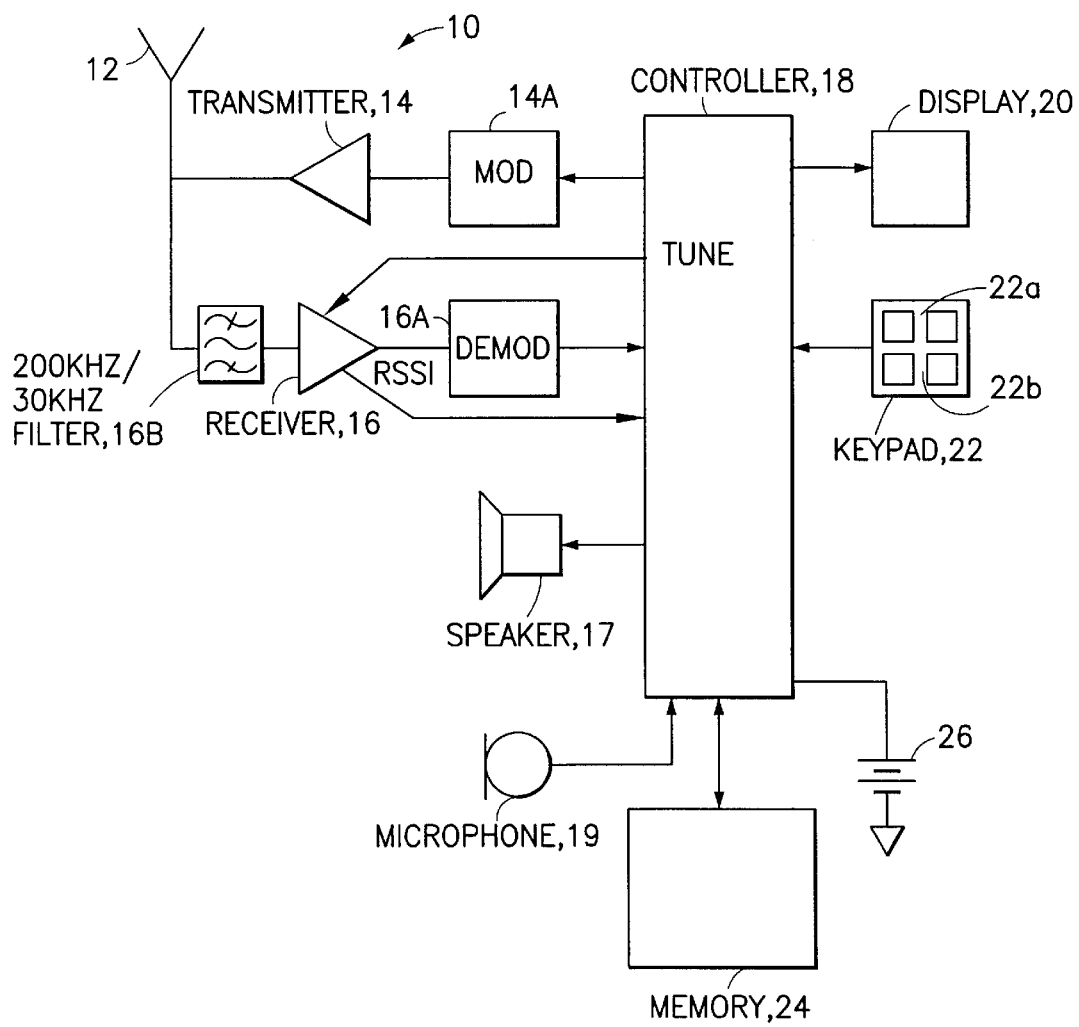
FIG. 1 is a block diagram of a mobile terminal that is constructed and operated in accordance with this invention.
Figure 2:
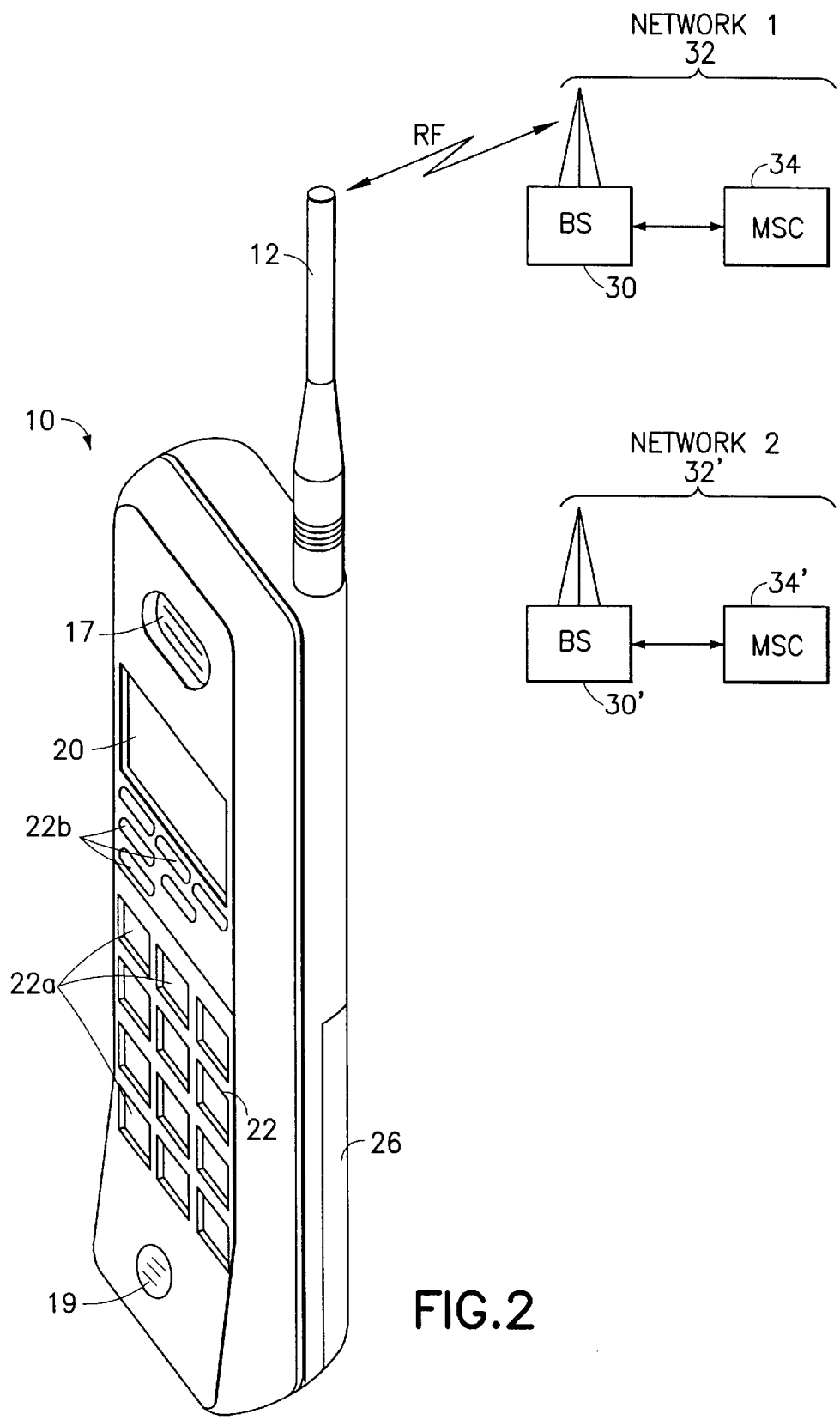
FIG. 2 is an elevational view of the mobile terminal shown in FIG. 1, and which further illustrates first and second networks operating with different channel bandwidths and possibly in different frequency bands.

Reference is made to FIGS. 1 and 2 for illustrating a wireless mobile terminal 10, such as but not limited to a cellular radiotelephone or a personal communicator, that is suitable for practicing this invention. The mobile station 10 includes at least one antenna 12 for transmitting signals to and for receiving signals from a base site or base station 30. The base station 30 is a part of a first network 32 that includes a mobile switching center (MSC) 34. The MSC 34 provides a connection to landline trunks when the mobile station 10 is involved in a call. A second network 32' is also shown. Other, unillustrated, networks may be present as well. By example only, the network 32 may be a GSM1900 network, while the network 32' may be a TDMA1900, or an AMPS network, or a CDMA1900 network.

For the purposes of explaining this invention the mobile terminal 10 is assumed to be a dual band (800 MHz/1900 MHz), quadruple mode (AMPS/TDMA800/TDMA1900/GSM1900) mobile terminal employing a single receiver and baseband circuitry. Of course, this specific embodiment is not to be read in a limiting sense upon the practice of this invention.

The mobile terminal 10 includes a modulator (MOD) 14A, a transmitter 14, the single receiver 16 with a demodulator (DEMOD) 16A, and a controller 18 that provides signals to and receives signals from the transmitter 14 and receiver 16, respectively. These signals include signalling information in accordance with the air interface standard of the applicable wireless system, and also user speech and/or user generated data. It is understood that the controller 18 also includes the circuitry required for implementing the audio and logic functions of the mobile terminal. By example, the controller 18 may be comprised of a digital signal processor device, a microprocessor device, and various analog to digital converters, digital to analog converters, and other support circuits. The control and signal processing functions of the mobile terminal are allocated between these devices according to their respective capabilities.

The receiver 16 is shown to include a filter 16B, which can be taken to represent a 200 kHz passband filter as well as a 30 kHz bandpass filter. While in practice two separate filters may be provided, it is also within the scope of the teaching of this invention to provide a single filter having a variable and programmable passband. The receiver 16 outputs a RSSI signal to the controller 18. The generation of the RSSI signal may be conventional in practice; for example it may be derived from an intermediate frequency (IF) stage of the receiver 16. The receiver 16 is assumed to be tunable over a range of frequencies in both the 800 MHz and 1900 MHz bands, under the control of a TUNE signal from the controller 18, and the baseband clock is derived from the receive clock.

Although not particularly germane to an understanding of this invention, a user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile terminal 10 such as, by example, a SEND key, various menu scrolling and soft keys, and a PWR key. The mobile terminal 10 also includes a battery 26 for powering the various circuits that are required to operate the mobile terminal, as well as various memories, shown collectively as the memory 24. The memory 24 is assumed to contain a stored program for causing the controller 18 to execute a method in accordance with this invention.

Having described one suitable but limiting embodiment of a multi-mode, dual band mobile terminal 10, a discussion is now made of a 30 kHz/200 kHz carrier identification technique in accordance with the teachings of this invention. A specific example will be given for GSM1900 carrier identification, and it will become apparent that the teachings of this invention are not limited for use with only this one particular type of network.

Figure 6:
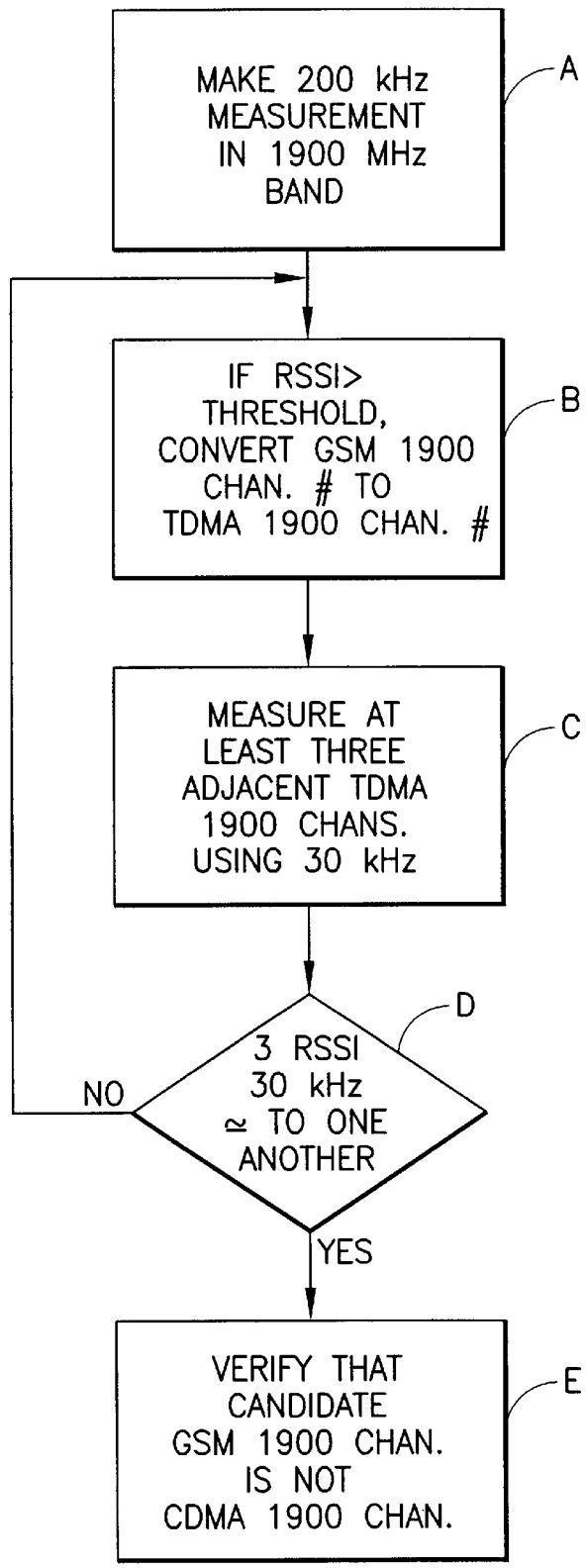
FIG. 6 is a logic flow diagram in accordance with a method of this invention.

The GSM1900 carrier is identified from TDMA1900 or CDMA1900 carriers by the following method. Reference should also be had to the logic flow diagram of FIG. 6.

Figure 3:
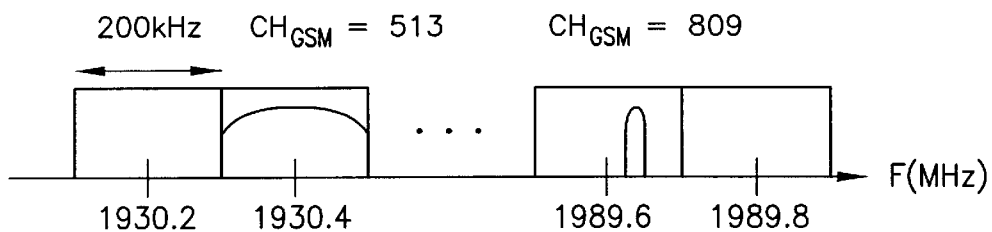
FIG. 3 illustrates an exemplary 1900 MHz band measured through a 200 kHz filter.

Step (A): Referring to FIG. 3, first the mobile terminal 10 tunes the receiver 16 and measures either a desired frequency block (A,B,C,D,E or F) or blocks from the 1900 MHz band through the 200 kHz filter 16B. The predetermined GSM1900 channel raster is used. If the entire band is measured (Blocks A,B,C,D,E or F), then the measurements are made from 299 different channels. Preferably the channels are organized by RSSI level, with the strongest channel being first in the channel list. Only if the RSSI level of at least the most powerful channel exceeds the RSSI threshold does control proceed to Step B. If not, then Step A is repeated after some period of time (e.g. 6 minutes). The operator can select the desired period for the search of the network.

The mobile terminal 10 is assumed to be camped on a paging or control channel (e.g., AMPS or TDMA800) at this time, and to be periodically monitoring same for pages using the mobile terminals's baseband circuitry. However, and in accordance with an aspect of this invention, tuning the receiver 16 to make a measurement in the 1900 MHz band does not imply that the mobile terminal 10 also changes the baseband clock frequency.

Step (B): Assuming that the RSSI level is found to be above a predetermined threshold level in Step A (indicating the possibility that a GSM1900 channel is present), then the GSM1900 channel number is converted to an equivalent TDMA1900 channel number according to the following formula:

$$CH_{TDMA} = \text{Round}\left(\frac{20 CH_{GSM} - 10222}{3}\right).$$

Figure 4:
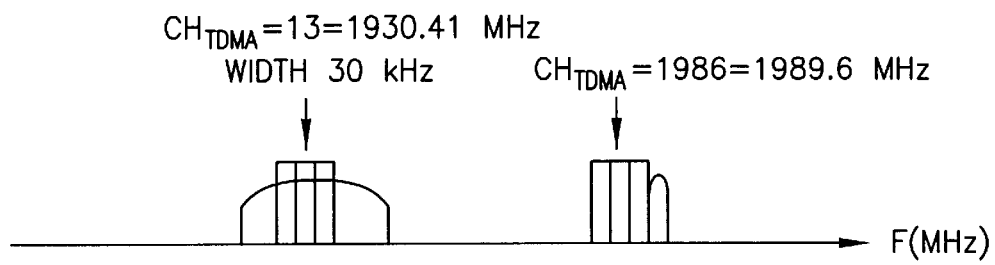
FIG. 4 illustrates a channel above threshold level measured through a 30 kHz filter.

Step (C): Referring to FIG. 4, the controller 18 of the mobile terminal 10 next measures, using the 30 kHz filter 16B, at least three adjacent TDMA1900 channels : e.g., $CH_{TDMA-1}$, $CH_{TDMA}$, $CH_{TDMA+1}$.

Step (D): If the RSSI values of the three adjacent (possible) TDMA1900 channels signal levels are sufficiently close together (e.g., approximately equal to one another within some second threshold), then control passes to Step E, otherwise control passes back to Step B. The three adjacent TDMA1900 channels signal levels being sufficiently close together is indicative of the absence of a TDMA1900 system in this portion of the spectrum, as it was stated above that good cell design practice would normally not place adjacent 30 kHz TDMA1900 channels in the same cell. It is noted that at least the GSM1900 Broadcast Control Channel (BCCH) carrier has constant power in all time slots, and is a good candidate to attempt to measure.

It should also be noted that more than one channel from the block is tested, since the GSM1900 BCCH may not necessarily be the most powerful, although it normally can be located from the most powerful channels. The number of channels tested for each block is best set empirically, and in each frequency block the method will typically use but one detection technique at a time (e.g., GSM1900, TDMA1900, or CDMA1900). Note also that if the network is well designed, then adjacent neighboring cells do not use channels which are adjacent to the own-cell channels.

It is further noted that if the network is well designed then the channels from neighboring cells will not normally be received at a level higher than the level of the own-cell channels. As such, even if the mobile terminal 10 is located at or near to a cell boundary, and if the own cell and adjacent cell(s) happen to use three adjacent TDMA1900 channels, it is unlikely that the three adjacent channels will have RSSI levels (measured through the 30 kHz filter) that will fall within the channel "adjacency" threshold. If, however, this is found in practice to not always be the case, then the method can measure more than three channels, and may as well tighten the limits of how much the levels can vary between channels, before a particular channel is taken to be a candidate GSM1900 channel.

Figure 5:
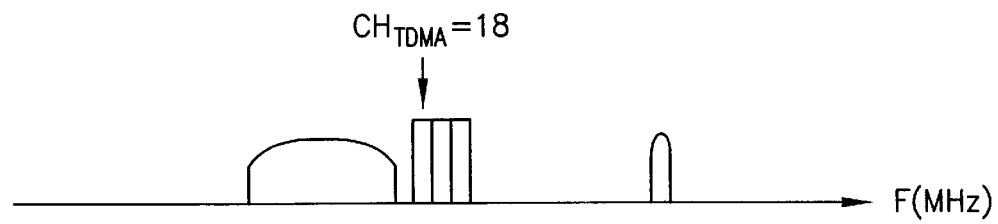
FIG. 5 depicts an adjacent GSM1900 channel measured through the 30 kHz filter.

Step (E): If the three adjacent TDMA1900 channels signal levels are found to be sufficiently close together, next a check is made to insure that the possible GSM1900 channel is not instead a CDMA1900 channel. This is done by measuring the adjacent GSM1900 200 kHz channel through the TDMA1900 30 kHz filter 16B (see FIG. 5). For the example of FIG. 4, three adjacent TDMA1900 channels in the adjacent 200 kHz GSM1900 channel would be: $CH_{TDMA+5}$, $CH_{TDMA+6}$, $CH_{TDMA+7}$, i.e, $CH_{TDMA}$=18, 19 and 20. These channel numbers may also need to be determined empirically. If the adjacent TDMA1900 channel signal levels are not approximately equal to one another, it is verified that the $CH_{GSM}$ is a GSM1900 channel. If they are, then a CDMA1900 channel may be indicated.

In further detail, the CDMA1900 channels are spaced apart by 1.23 MHz, in the same manner as the CDMA800 channels. If the GSM1900 network is well planned, then it will not have adjacent channels in use in the same cell, similar to the TDMA1900 case. As such, if in Step D it is determined that a particular channel is possibly a GSM1900 channel, the method will measure the neighbor GSM1900 channel, through the 30 kHz filter, and it will be detected that there are not the three adjacent channels with about the same signal levels. If, however, it is detected that the three adjacent channels do exhibit about the same signal level, then the adjacent channel is possibly a CDMA1900 channel, otherwise it is a GSM1900 channel.

Further in accordance with this invention, the possible presence of a CDMA800 carrier (bandwidth 1.23 MHz) is determined by verifying that adjacent 30 kHz channel levels are not too close to one another.

While the invention has been particularly shown and described with respect to preferred embodiments thereof, it will be understood by those skilled in the art that changes in form and details may be made therein without departing from the scope and spirit of the invention.

What is claimed is:

1. A method for use by a mobile terminal for identifying a presence of a first carrier that is channelized into first channels having a bandwidth X, and for distinguishing the first carrier from a second carrier that is channelized into second channels having a bandwidth Y, where the first carrier and the second carrier each occupy at least a portion of a same first frequency band, and where X>Y, comprising steps of:

tuning a receiver to a frequency of a candidate one of said first channels and determining a received signal strength indication for a received signal filtered through a filter having a passband of X;

if the received signal strength indication is above a predetermined threshold, converting the frequency of the candidate one of the first channels into a frequency of a corresponding one of said second channels in accordance with a predetermined relationship, and tuning the receiver to the frequency of the corresponding one of the second channels;

determining a plurality of received signal strength indications for a received signal filtered through a filter having a passband of Y for the corresponding one of the second channels and also for a plurality of adjacent second channels; and if the plurality of received signal strength indications are all found to be approximately equal, within some threshold value, verifying the presence of the first carrier.

2. A method as in claim 1, wherein the first carrier is associated with a GSM1900 carrier.

3. A method as in claim 2, wherein the second carrier is associated with a TDMA1900 carrier.

4. A method as in claim 3, wherein the step of verifying operates to verify that the second carrier is not associated with a CDMA1900 carrier.

5. A method as in claim 1, wherein X=200 kHz and Y=30 kHz.

6. A method as in claim 1, and comprising an initial step of camping on a channel of a carrier in a second frequency band, and wherein the steps of tuning are executed without changing a baseband clock frequency from a frequency associated with the channel that the mobile terminal is camped on.

7. A method as in claim 6, wherein the first frequency band is the 1900 MHz band, and wherein the second frequency band is the 800 MHz band.

8. A mobile terminal comprising a receiver having a first filter with a bandwidth of X and a second filter with a bandwidth of Y, where X>Y, said receiver having an output providing a received signal strength indication (RSSI), and further comprising a controller coupled to said receiver and a stored program executed by said controller for identifying a presence of a first carrier that is channelized into first channels having a bandwidth X, and for distinguishing the first carrier from a second carrier that is channelized into second channels having a bandwidth Y, where the first carrier and the second carrier each occupy at least a portion of a same first frequency band, comprising circuitry for tuning said receiver to a frequency of a candidate one of said first channels and for determining a RSSI value for a received signal filtered through said first filter, said stored program being responsive to a condition that the RSSI value is above a predetermined threshold for converting the frequency of the candidate one of the first channels into a frequency of a corresponding one of said second channels in accordance with a predetermined relationship, and for retuning the receiver to the frequency of the corresponding one of the second channels and then determining a plurality of received signal strength indications, for a received signal filtered through said second filter, for the corresponding one of the second channels and also for a plurality of adjacent second channels; and said stored program being responsive to a condition wherein the plurality of received signal strength indications are all found to be approximately equal, within some threshold value, for verifying the presence of the first carrier.

9. A mobile terminal as in claim 8, wherein the first carrier is associated with a GSM1900 carrier, wherein the second carrier is associated with a TDMA1900 carrier, and wherein X=200 kHz and Y=30 kHz.

10. A mobile terminal as in claim 9, wherein the stored program operates to verify that the second carrier is not associated with a CDMA1900 carrier.

11. A mobile terminal as in claim 8, wherein said mobile terminal is initially camped on a channel of a carrier in a second frequency band, and the receiver is tuned and retuned without changing a baseband clock frequency from a frequency associated with the channel that the mobile terminal is camped on.

12. A mobile terminal as in claim 11, wherein the first frequency band is the 1900 MHz band, and wherein the second frequency band is the 800 MHz band.

13. A method for use by a multi-mode, dual band mobile terminal for identifying a presence of a GSM1900 carrier that is channelized into first channels having a bandwidth of 200 kHz, and for distinguishing the GSM1900 carrier from at least a TDMA1900 carrier that is channelized into second channels having a bandwidth of 30 kHz, comprising steps of:

tuning a receiver to a frequency of a candidate GSM1900 channel number;

determining a value of a received signal strength indicator (RSSI) using a 200 kHz receiver passband filter;

if the RSSI value is above a predetermined threshold, converting the candidate GSM1900 channel number into a frequency of an equivalent TDMA1900 channel number using a predetermined relationship;

retuning the receiver to the frequency of the equivalent TDMA1900 channel number;

determining a RSSI value using a 30 kHz receiver passband filter for the equivalent TDMA1900 channel, and also for at least two adjacent TDMA1900 channels, assuming that two adjacent TDMA1900 channels are not used together in a same cell; and if the at least three RSSI values are all found to be approximately equal, within some threshold value, making at least an initial assumption of the presence of the GSM1900 carrier.

14. A method as in claim 13, and further comprising a step of verifying that the assumed GSM1900 carrier is not actually a CDMA1900 carrier.

15. A method as in claim 13, and comprising an initial step of camping on a channel of a carrier in another frequency band, and wherein the steps of tuning and retuning are executed without changing a baseband clock frequency from a frequency associated with the channel that the mobile terminal is camped on.

16. A method as in claim 15, and wherein the other frequency band is the 800 MHz band.

17. A method as in claim 13, wherein the step of converting the GSM1900 channel number to an equivalent TDMA1900 channel number is accomplished according to the following formula:

$$CH_{TDMA} = \text{Round}\left(\frac{20 CH_{GSM} - 10222}{3}\right).$$

* * * * *